United States Patent
Wlasowski

(10) Patent No.: US 9,194,245 B2
(45) Date of Patent: Nov. 24, 2015

(54) PROCESS FOR FRICTION WELDING BLADES TO THE DRUM OF AN AXIAL COMPRESSOR AND A CORRESPONDING DEVICE

(75) Inventor: Michel Wlasowski, Verviers (BE)

(73) Assignee: Techspace Aero S.A. (BE)

( * ) Notice: Subject to any disclaimer, the term of this patent is extended or adjusted under 35 U.S.C. 154(b) by 683 days.

(21) Appl. No.: 13/495,602

(22) Filed: Jun. 13, 2012

(65) Prior Publication Data
US 2012/0318774 A1 Dec. 20, 2012

(30) Foreign Application Priority Data

Jun. 17, 2011 (EP) ..................................... 11170460

(51) Int. Cl.
*F01D 5/30* (2006.01)
*B23K 20/12* (2006.01)
*F01D 5/34* (2006.01)

(52) U.S. Cl.
CPC .............. *F01D 5/3061* (2013.01); *B23K 20/12* (2013.01); *B23K 20/129* (2013.01); *F01D 5/34* (2013.01); *B23K 2201/001* (2013.01); *F05B 2230/239* (2013.01); *F05D 2230/232* (2013.01)

(58) Field of Classification Search
USPC ...................................................... 228/112.1
See application file for complete search history.

(56) References Cited

U.S. PATENT DOCUMENTS

| | | | | |
|---|---|---|---|---|
| 3,088,343 A | * | 5/1963 | Kuris et al. ..................... 228/1.1 |
| 3,478,410 A | * | 11/1969 | Squibb et al. .............. 228/112.1 |
| 3,732,613 A | * | 5/1973 | Steigerwald ................ 228/112.1 |
| 3,733,238 A | * | 5/1973 | Long et al. ..................... 56/580.1 |
| 3,768,147 A | * | 10/1973 | Berry et al. ................. 228/112.1 |
| 3,800,578 A | * | 4/1974 | Brennan et al. ..................... 72/56 |
| 4,858,815 A | * | 8/1989 | Roberts et al. ................. 228/2.3 |
| 4,934,583 A | * | 6/1990 | Patsfall ......................... 228/44.3 |
| 5,035,411 A | * | 7/1991 | Daines et al. ................. 269/231 |
| 5,148,957 A | * | 9/1992 | Searle ............................. 228/2.1 |
| 5,277,744 A | * | 1/1994 | Snyder ........................... 156/580 |
| 5,468,334 A | * | 11/1995 | Searle ........................... 156/580 |
| 5,486,262 A | * | 1/1996 | Searle ........................... 156/580 |
| 5,511,949 A | * | 4/1996 | Thore ....................... 416/213 R |

(Continued)

FOREIGN PATENT DOCUMENTS

| | | |
|---|---|---|
| EP | 0397387 A2 | 11/1990 |
| EP | 0404531 A1 | 12/1990 |
| EP | 2281653 A1 | 2/2011 |

OTHER PUBLICATIONS

EPO Search Report from priority application No. EP 1117046.7, dated Nov. 21, 2011.

*Primary Examiner* — Dana Ross
*Assistant Examiner* — Renee L Miller
(74) *Attorney, Agent, or Firm* — Polster Lieder

(57) ABSTRACT

The present disclosure provides a process and a device for the orbital friction welding of blades to the drum of an axial compressor. The process consists of holding the drum on a cradle via an indexing table, the cradle being able to pivot and vertically movable so as to present different regions of its outer surface parallel to the plane of orbital motion of the blade. The blade is held in the orbital motion device by a clamping device. The inner surface of the drum is braced by supports carried by a core fixed to the cradle. The drum comprises a series of protrusions which have a blade-shaped cross section. These protrusions form faying surfaces for the blades. The blades have a plate to ensure they are satisfactorily clamped by the clamping device.

13 Claims, 4 Drawing Sheets

(56) References Cited

U.S. PATENT DOCUMENTS

| | | | | |
|---|---|---|---|---|
| 5,697,545 | A * | 12/1997 | Jennings et al. | 228/112.1 |
| 5,813,593 | A * | 9/1998 | Galaske, Jr. | 228/112.1 |
| 5,865,364 | A * | 2/1999 | Trask et al. | 228/212 |
| 6,095,402 | A * | 8/2000 | Brownell et al. | 228/112.1 |
| 6,106,233 | A * | 8/2000 | Walker et al. | 416/213 R |
| 6,145,730 | A * | 11/2000 | Wiesemann | 228/112.1 |
| 6,160,237 | A * | 12/2000 | Schneefeld et al. | 219/78.02 |
| 6,354,482 | B1 * | 3/2002 | Diebold et al. | 228/112.1 |
| 6,478,545 | B2 * | 11/2002 | Crall et al. | 416/213 R |
| 6,524,072 | B1 * | 2/2003 | Brownell et al. | 416/213 R |
| 6,595,401 | B2 * | 7/2003 | Collot et al. | 228/44.3 |
| 6,834,790 | B2 * | 12/2004 | Bagnall | 228/112.1 |
| 6,844,515 | B2 * | 1/2005 | Byrnes et al. | 219/69.11 |
| 6,933,459 | B2 * | 8/2005 | Helder et al. | 219/117.1 |
| 6,964,557 | B2 * | 11/2005 | Helder et al. | 416/96 R |
| 7,052,379 | B2 * | 5/2006 | Burgess | 451/231 |
| 7,360,676 | B2 * | 4/2008 | Gheorghe | 228/112.1 |
| 7,419,082 | B2 * | 9/2008 | Brownell et al. | 228/2.1 |
| 7,441,689 | B2 * | 10/2008 | Crasser | 228/110.1 |
| 7,959,056 | B2 * | 6/2011 | Pfeiler | 228/113 |
| 2002/0070259 | A1 * | 6/2002 | Crasser | 228/2.1 |
| 2002/0136856 | A1 * | 9/2002 | Sugimura et al. | 428/60 |
| 2003/0007827 | A1 * | 1/2003 | Broadhead et al. | 403/13 |
| 2003/0197049 | A1 * | 10/2003 | Bagnall | 228/112.1 |
| 2003/0201305 | A1 * | 10/2003 | Trask | 228/112.1 |
| 2004/0004108 | A1 * | 1/2004 | Halley et al. | 228/56.3 |
| 2004/0020970 | A1 * | 2/2004 | Palm | 228/112.1 |
| 2004/0238599 | A1 * | 12/2004 | Subramanian et al. | 228/112.1 |
| 2005/0224559 | A1 * | 10/2005 | Pfeiler | 228/112.1 |
| 2005/0274010 | A1 * | 12/2005 | Rawson et al. | 29/889.1 |
| 2006/0231593 | A1 * | 10/2006 | Bayer et al. | 228/112.1 |
| 2009/0113708 | A1 * | 5/2009 | Bamberg et al. | 29/889.21 |
| 2010/0158690 | A1 * | 6/2010 | Cortequisse et al. | 416/213 R |
| 2011/0031299 | A1 * | 2/2011 | Bray et al. | 228/112.1 |
| 2011/0119914 | A1 * | 5/2011 | Janssen et al. | 29/888.04 |
| 2011/0135954 | A1 * | 6/2011 | Nakagawa et al. | 428/615 |

* cited by examiner

PROCESS FOR FRICTION WELDING BLADES TO THE DRUM OF AN AXIAL COMPRESSOR AND A CORRESPONDING DEVICE

CROSS-REFERENCE TO RELATED APPLICATIONS

This application claims the benefit, under 35 U.S.C. §119, of European Application No. EP 11170460.7, which was filed on Jun. 17, 2011 the disclosure of which is incorporated here by reference in its entirety.

FIELD

The present teachings relate to a friction welding process for attaching blades to an axial turbomachine rotor, in particular to a drum of an axial turbomachine compressor. The present teachings also relate to a corresponding device for implementing the friction welding process and to an axial turbomachine rotor resulting from implementation of the friction welding process or use of the corresponding device.

BACKGROUND

The statements in this section merely provide background information related to the present disclosure and may not constitute prior art.

Friction welding is a welding process in which the mechanical heat necessary for welding is generated by rubbing the parts to be joined against each other under an axial forging pressure.

Patent US 2003/0201305 A1 discloses a friction welding device for attaching blades to a rotor. The principle of welding disclosed in this document is based on linear friction and uses a device initially designed for linear welding that is capable of imparting a back and forth motion to a work piece relative to the substrate to which it is intended that it be welded. The movement of the work piece, i.e. the blade, is guided to define a curved path generally matching the cross-sectional profile of the blade. The purpose of the curved path is to avoid a part of the blade's contact surface with the rotor being exposed during friction and undergoing direct contact with the ambient air and uncontrolled cooling. This solution is therefore particularly suitable for highly curved blades. This process, however, requires heavy and expensive equipment, especially because of the use of linear friction welding. Indeed, reciprocating back and forth movements of the work piece are very restrictive, particularly in terms of the equipment that moves the work piece. This solution is therefore not particularly attractive on cost grounds, especially from a fixed cost point of view.

Patent EP 2281653 A1 discloses a method of friction welding of blades in a fan disk or a fan at the intake to an axial turbomachine. This patent focuses on the problem of the lack of control over the forging pressure at the extremities of the faying surfaces of the pieces to be welded, when the section of material below the faying surface decreases at too steep an angle. The method described is notable in that it provides for a first contact zone under the faying surface without any reduction in section, which is then followed by a second zone with the material tapering off. The welding process that is described therein is a linear friction welding process. It suggests that an orbital friction welding method can also be used, without specifying the conditions under which it can be used. As in the previous patent, this patent focuses on a linear friction welding process which necessitates expensive equipment.

SUMMARY

The present disclosure relates to a friction welding process for attaching blades to an axial turbomachine rotor. The process includes: (a) positioning the rotor so as to have a faying surface for one blade; (b) starting a frictional movement of the blade against the faying surface for the blade, essentially in a mean contact plane of the blade with the surface so as to reach a welding temperature, the rotor being held stationary in the plane of frictional movement of the blade; and (c) immobilizing the blade and forging the blade onto the rotor. Importantly, the frictional movement of the blade at the faying surface is a substantially orbital movement.

Advantageously, the rotor remains completely immobile during the welding operation set forth in step (b) and (c), such that step (c) affects the blade alone.

Generally, the blade is constantly pressed against the faying surface of the rotor during step (b). In various implementations the pressure can be increased during step (c). However, in other implementations, the pressure can be varied during step (b) and/or (c).

According to an advantageous embodiment of the invention, the rotor is a compressor drum that, in various embodiments, comprises a hollow body that is generally circularly symmetrical about the axis of the rotor and defining a hollow interior volume with a first aperture at the front end of the drum and a second aperture at the rear end.

The rotor can comprise at least two rows of blades, or alternatively at least three rows of blades.

According to another advantageous embodiment of the invention, step (a) comprises locating at least one support on the inside of the rotor's faying surface for the blade so as to brace the faying surface with respect to the forging pressure being exerted on the blade during step (c). The support can also brace the faying surface during step (b).

According to yet another advantageous embodiment of the invention, locating at least one support within the drum comprises inserting a core inside the drum, the core being designed to be the basis for the support of the opposite internal surface of the drum, the core can extend over at least half the length of the drum between the first and second apertures.

According to yet another advantageous embodiment of the invention, step (a) comprises locating the rotor on a cradle via an indexing table so as to angularly position the rotor about its main axis relative to the cradle.

According to yet another advantageous embodiment of the invention, the cradle is designed to be capable of pivoting about a transverse axis. In various embodiments, the pivoting can be perpendicular to both the main axis of the rotor and to the direction of the pressure applied to the blade against the rotor during step (c). In various embodiments, this axis is horizontal.

According to yet another advantageous embodiment of the invention, the cradle is movable in translation along a direction generally perpendicular to the direction of applying pressure to the blade against the rotor during step (c) and mainly within a plane containing the principal axis of the rotor. In various embodiments, this direction is vertical.

According to yet another advantageous embodiment of the invention, step (b) comprises gripping the blade by a clamping device provided with a means for rapid fixing. The clamping device may take the form of a cassette. In various embodiments, the clamping device comprises at least one jaw for clamping the body of the blade and further comprises a suitable opening or cavity into which the blade can be inserted.

According to yet another advantageous embodiment of the invention, the rotor comprises protrusions shaped to the profiles of the blades, forming faying surfaces for the blades before they are welded.

According to yet another advantageous embodiment of the invention, the blade comprises a plate on the part to be welded to the rotor, the plate having a protrusion whose section has a blade profile and is intended to be in contact with the faying surface for the blade.

The invention relates also to a friction welding device for attaching the blades to an axial turbomachine rotor. The device includes a supporting frame, a rotor support designed to hold the rotor stationary during the friction welding operation, and a blade support for holding the blade fixed for the friction movement and the forging movement towards the rotor. Importantly, the blade support is designed to impart an orbital motion to the blade.

According to an advantageous embodiment of the invention, the rotor support comprises a cradle pivotally mounted relative to an axis substantially horizontal and perpendicular to the forging movement direction, and the cradle comprises an indexing table designed to angularly position the rotor about its axis of rotation.

According to another advantageous embodiment of the invention, the cradle can comprise a mounting bed for the rotor and a bearing at a distance from the mounting bed, the bearing being able to support a shaft generally perpendicular to the mounting bed.

According to yet another advantageous embodiment of the invention, the cradle comprises a core designed to be secured to the indexing table and designed to act as a support for the rotor's inner surface supports.

According to yet another advantageous embodiment of the invention, the blade support comprises a mounting for holding a tapered clamping device for clamping the blade.

The invention further relates to an axial turbomachine rotor constructed using the process and/or the device described above.

The solution proposed by the invention has the advantage of enabling an axial turbomachine rotor axial to be made at a very reasonable cost. Linear friction welding is, in fact, commonly used for massive and compact disc rotors, commonly called bladed disks or blisks, or annular rotors, commonly called bladed rings or blings, particularly in configurations where the rotor is fixed. However, this process requires expensive equipment, particularly because of the nature of the alternating back and forth movement of the workpiece. Orbital friction welding, compared with linear friction welding, has not appeared to be the obvious way of attaching blades because of the elongated shape of the blades. In fact, with orbital friction welding where the two surfaces are usually in motion, the component of movement which is perpendicular to the main axis of the blade is capable of fully covering the mating surface. The inventors have discovered that applying an orbital friction motion to a process where the rotor is stationary, at least in terms of the plane of orbital motion, has many advantages. These include the simplification of the kinematics of the machine and its associated parts, resulting in lower equipment costs and reduced power consumption. The method of clamping the blade, however, requires particular care because of the movement in both the main X and Y directions and the spacing between the blades. For drum type rotors, special measures may be needed both for clamping as well as for supporting the hollow body of the drum. With the aim of further reducing manufacturing costs and the resulting reduction in the amount of machine time needed, clamping the blade and positioning the rotor deserve especial attention.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 1 is a cross-sectional view of an axial double-flow turbomachine, with multiple rotors fitted with blades attached using the inventive process described below. FIG. 1 includes an enlarged view of a partial section of a low-pressure compressor part of the turbomachine, the blades being attached to the compressor rotor utilizing an orbital friction welding device, shown in FIG. 2, structured and operable to implement the inventive process in accordance with the invention.

Corresponding reference numerals indicate corresponding parts throughout the several views of drawings.

DETAILED DESCRIPTION

Figure 1:
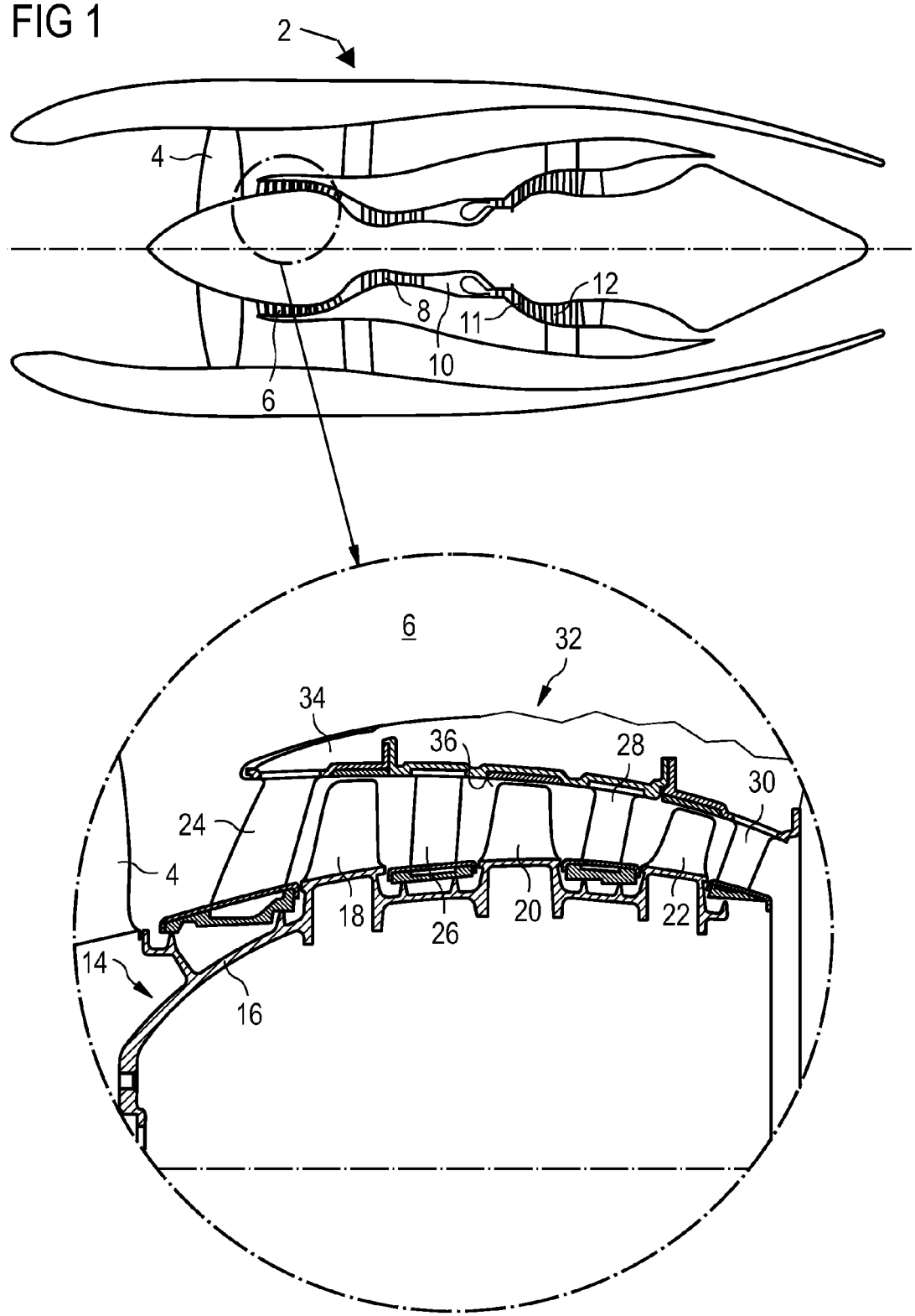

The following description is merely exemplary in nature and is in no way intended to limit the present teachings, application, or uses. Throughout this specification, like reference numerals will be used to refer to like elements.

FIG. 1 shows an aero engine double-flow axial turbomachine 2. The turbomachine 2 comprises, in order, from intake to outlet: a fan 4, a low-pressure compressor 6, a high-pressure compressor 8, a combustion chamber 10, a high-pressure turbine 11 and a low-pressure turbine 12. Intake air is forced into the machine by the fan 4 and is then split into a primary flow through the various components mentioned above and a secondary flow through the machine outside these components, joining the primary flow at the outlet to generate propulsive thrust.

The low-pressure compressor 6 is illustrated in detail in the magnified portion of FIG. 1 and comprises essentially a rotor 14 (also referred to herein as drum 14) and a stator 32. The rotor 14 is formed by a hollow body 16 generally symmetrical in revolution about its axis of rotation, the hollow body 16 being provided with rows of rotor blades 18, 20 and 22. The stator 32 comprises a splitter nose 34 dividing the intake stream and a wall 36 defining the primary flow and provided with rows of stator vanes 24, 26, 28 and 30. The rows of stator vanes 24/26/28/30 and rotor blades 18/20/22 are arranged alternately so as to form several compression stages, each stage being formed by a rotor blade row and a stator blade row pair.

Dynamic sealing devices generally known to one skilled in the art are fitted between the tips of the rotor blades 18, 20 and 22 and the wall 36 delimiting the fluid stream of the primary flow, and between the tips of stator blades 24, 26, 28 and 30 with the hollow body 16 of the drum 14.

The drum 14 is typically made of metallic material such as, for example, titanium or stainless steel. The hollow body 16 has the general shape of an ogive defining a hollow internal volume. It can be manufactured by machining from a rough forged hollow body. This rough hollow body will have a profile and a thickness close to the maximum profile and thickness of the finished hollow body 16 as shown in FIG. 1, in order to minimize both the amount of material to be removed and the machine time associated with this operation.

The rotor blades 18/20/22 are manufactured separately and then attached to the hollow body 16 of the drum 14. In fact, although it is of course possible to machine the rotor blades 18/20/22 directly from the rough form that will eventually be the drum 14, it is nevertheless desirable, mainly for economic reasons, for the rotor blades 18/20/22 to be manufactured separately and then attached to the hollow body 16 of the drum 14. This is particularly true if the drum 14 has a large diameter as, in which case, the number of rotor blades 18/20/22 increases steeply and the time for to machine them from the forging would be very long, not to mention the cost of the raw material needed for the rough hollow body 16.

In various embodiments, the rotor blades 18/20/22 are attached to the hollow body 16 of the drum 14 by an orbital friction welding process described herein and exemplarily illustrated in FIGS. 2 through 5.

Figure 2:
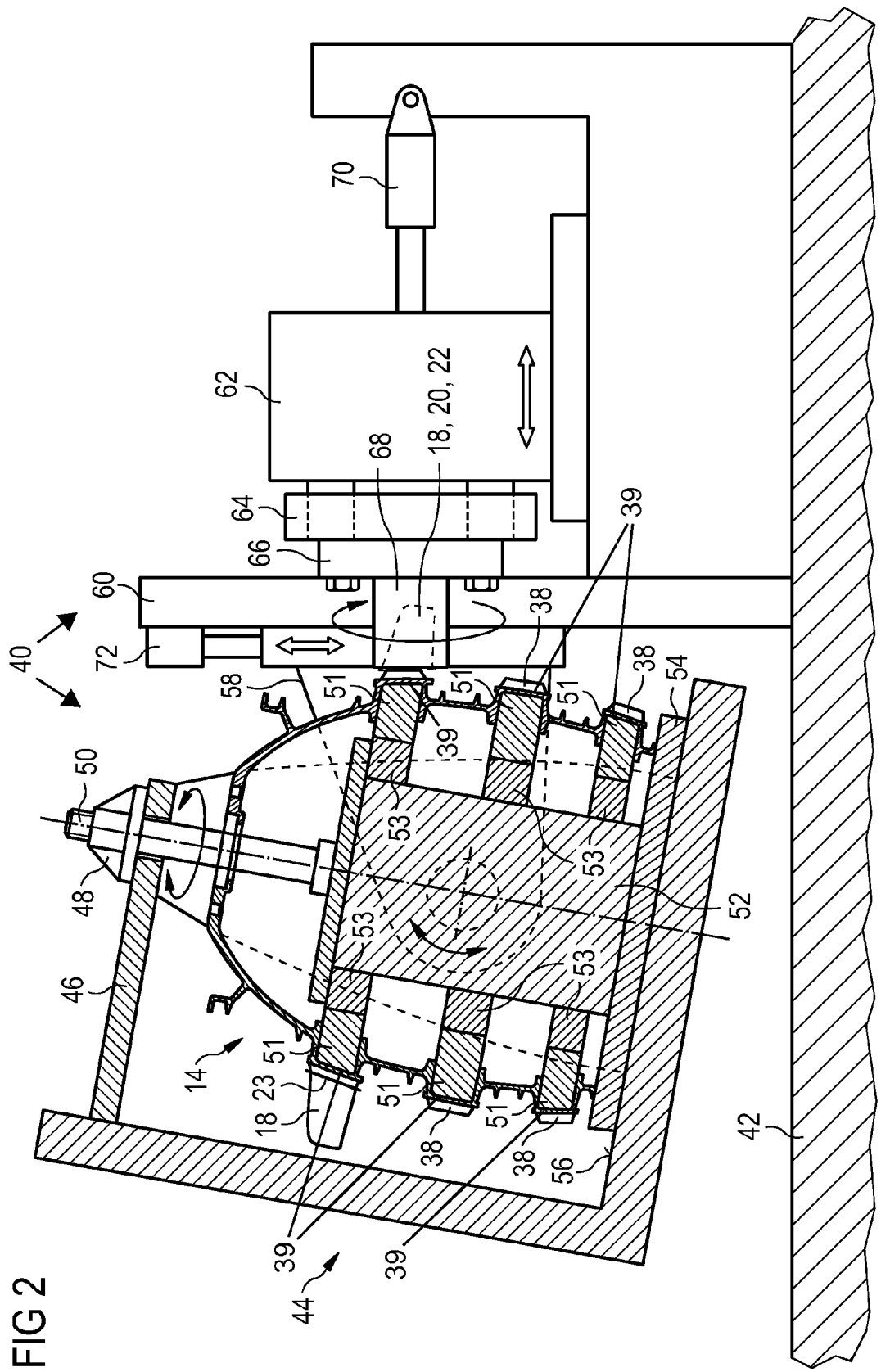
FIG. 2 is a plan and part section view of the orbital friction welding device in accordance with the invention.

FIG. 2 illustrates an orbital friction welding device 40 for an axial compressor drum such as the drum 14 shown in FIG. 1. The device 40 comprises a supporting frame 42 supporting a cradle 44 for the drum 14. It also comprises a blade support, capable of orbital friction motion, comprising of a clamping device 68 which grips the blade 18/20/22, a mounting 66 for the clamping device 68, a plate 64 to which the mounting 66 is rigidly attached and an orbital motion unit 62. This assembly is able to translate horizontally relative to the supporting frame by sliding on guide rails using a ram 70.

The cradle 44 comprises a mounting bed 56 for the drum 14, such that the drum 14 is located with a rear aperture of the drum 14 (relative to the direction of the air flow in the turbomachine) disposed on the mounting bed 56 so that the axis of rotation of the drum 14 is generally vertical. An indexing table 54 is located between the mounting bed 56 of the cradle 44 and a rear edge of the drum 14 so as to allow precise angular positioning of the drum 14 for the various blades 18/20/11 of each row. Some form of clamping (not shown) may be provided between the indexing table and the rear edge of the drum 14.

The cradle 44 also comprises a mounting arm 46 disposed directly above and at some distance from the mounting bed 56. The mounting arm 46 supports a bearing 48 for holding a shaft 50 passing through a front opening of the drum 14. The shaft 50 is linked to a core 52 that is disposable within the hollow space of the drum 14. The core 52 carries supports 51 that are disposable inside zones of the body 16 where the blades 18/20/22 will be joined. Locating devices 53 that are configured to clamp onto the supports 51 are designed to be fitted between the core 52 and the supports 51. The locating devices 53 and supports 51 can have various forms. For example, in various implementations, the supports 51 can be segmented and the locating devices 53 and the clamping device 68 can be eccentric.

The supports 51 are configured to support the hollow body 16 of the drum 14 during friction welding, especially when the respective blade 18/20/22 is subjected to a forging pressure against the drum 14 after heating due to orbital friction motion.

As shown in FIGS. 1 and 2, the hollow body 16 of the drum 14 also comprises the faying surfaces 39 for the rotor blades 18/20/22. As exemplarily illustrated in FIGS. 1 and 2, the faying surfaces 39 can have a particular geometry for optimizing the stiffness of the rotor 14 and its mass. In various embodiments, the drum 14 comprises three of faying surfaces 39, constructed in a similar manner. Each faying surface 39 is annular in shape and consists essentially of two parts in the hollow body 16 in the shape of ribs generally perpendicular to the axis of rotation and a central part supporting the blade row. The cross-section of each faying surface 39 is shaped like the Greek letter pi (π), wherein a central part extends higher than the surrounding wall 16 in a direction generally perpendicular to the axis of rotation and is oriented toward the outside of the hollow body 16, thereby enabling the outer surface of the central portion to be at the level of the surrounding interior shells delimiting the fluid stream (see detail in FIG. 1). The inner surfaces of the shells are, in fact, at some distance from the hollow body 16 due to the height of the lip seals and the shell's necessary thickness. The internal surfaces of the shells and of the central portions of the annular zones, which delimit the fluid stream, are generally offset and aligned to ensure that the flow is perturbed as little as possible.

The central part of each faying surface 39 for the blades 18/20/22 comprises a generally straight or slightly curved section that corresponds to the general shape of the fluid stream of the rotor 14. Each faying surface central part has a generally annular shape with integrally formed protrusions or stubs that form part of the blade roots. The central part of each faying surface 39 is a generally annular platform for the respective blade row. Each annular blade faying surface 39 thus forms an annular cavity inside the hollow body 16 that open towards the axis of rotation. The annular cavity is disposed within a plane passing through the axis of rotation and has an overall "U" shape, whose opening is directed towards the axis of rotation. Moreover, the annular cavities are structured receive and locate the supports 51.

The cradle 44 is pivotally mounted about an axis that is generally horizontal and substantially perpendicular to the blade 18/20/22 and to the direction of forging of the blade 18/20/22 and the drum 14. This axis is preferably arranged so as to cross the drum 14. It should be noted, however, that this axis can be at some distance from the drum 14. Pivoting of the cradle 44 enables the orientation of the drum 14 to be changed so as to have a blade faying surface 39 that is generally in the plane of the orbital motion of the respective blade 18/20/22. Accordingly, the cradle 44 is pivotally mounted relative to a guide 58 configured to move vertically relative to a vertical guide 60 of the supporting frame 42, and using the ram 70, such as a worm driven by an electric motor. This combination of vertical movement and pivoting the cradle 44 enables the drum 14 to be positioned to weld the blades 18/20/22 of the different stages.

The indexing table 54 and the rotating connection of the shaft 50 of the core 52 through the bearing 48 provides easy positioning of the drum 14 for attaching each blade 18/20/22 of a blade row without having to unclamp the drum 14 and having to make other accurate and time consuming adjustments.

The orbital motion of the blade is generated at the plate 64 by means of eccentrics driven by electric motors (not shown) of the orbital motion unit 62. Adjusting the phase shift between the eccentrics can change the motion imparted to the respective blade 18/20/22. The means for creating the orbital motion can be any means that is suitable for creating such orbital motion that is known to someone skilled in the art.

Figure 3:
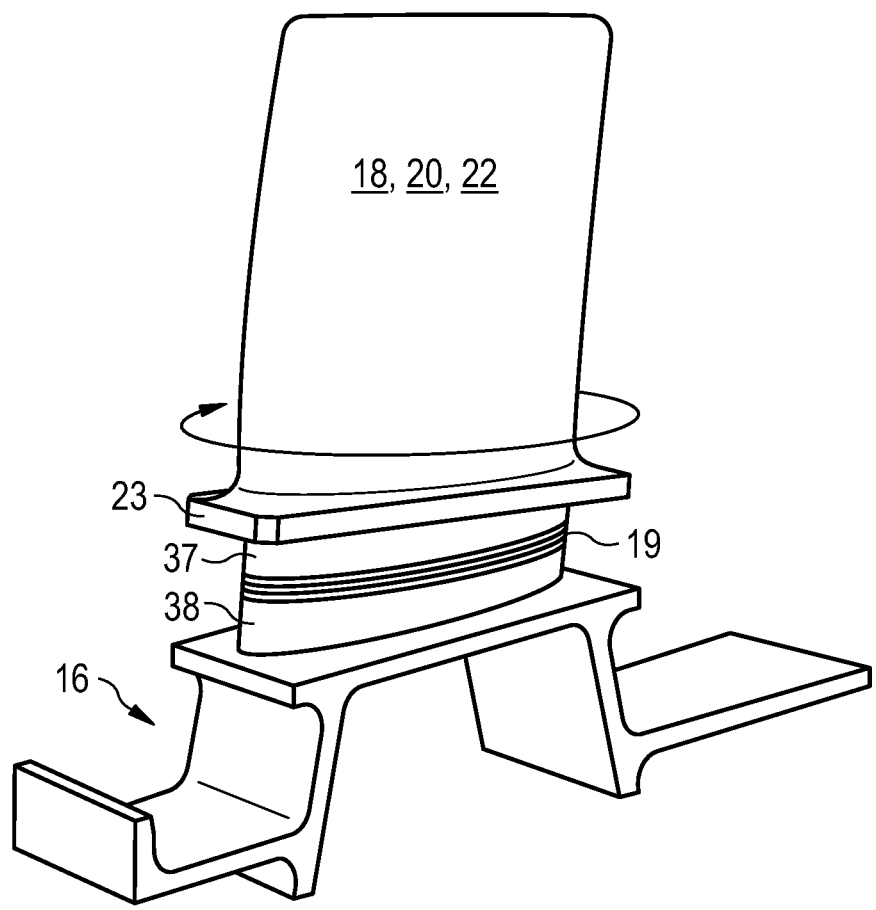
FIG. 3 is an isometric view of a portion of a drum of the compressor shown in FIG. 1, as well as a blade in an orbital motion on a corresponding protrusion of the drum.

FIG. 3 illustrates the principle of orbital friction welding between a blade 18/20/22 and the drum 16. Each respective blade 18/20/22 comprises a plate 23 near the end of a side of the blade intended to be welded to the drum 14. The plate 23 is essentially a means for clamping and positioning the blade 18/20/22, especially in a plane parallel to the orbital motion. In various embodiments, a protrusion 37 is provided under the plate 23 on the side of the plate 23 that is to be welded to the drum 14. In various implementations, the protrusion 37 can have a section whose profile is essentially the same as the profile of the respective blade 18/20/22. The protrusion 37 has a front surface which is brought into contact with a front surface of the corresponding protrusion 38 of the faying surface 39. The blade 18/20/22 and the corresponding front surface of the protrusion 37 of the plate 23 are moved along a generally orbital path of small radius so that the surface remains largely in contact with the surface of the corresponding protrusion 38 of the faying surface 39. The general orientation of the blade 18/20/22 remains constant. This movement is accompanied by pressure between the contact surfaces of the protrusions 37 and 38 so as to generate homogeneous heating of the entire interface area through a uniform tangential speed. This heating generates a forging or welding zone 19. Once the desired temperature is reached, the movement is stopped in a reference position and a forging force is exerted on the blade 18/20/22, pressing it against the drum 14 to form the weld.

After welding, machining may then be necessary to remove the interface material that has been pushed to the outside, commonly called flash, and to remove the plate 23. In various implementations, the machining is adaptive, such that it adapts to the surface of the blade 18/20/22 thus formed in the vicinity of the weld so as to avoid any spring-back related to the machining.

It should be noted that the presence of the protrusion 37 under the plate 23 is optional in view of the machining operation that follows.

It should also be noted that the presence of the protrusion 38 on the drum 14 is also optional. However, it facilitates the machining operation that follows.

Figure 4:
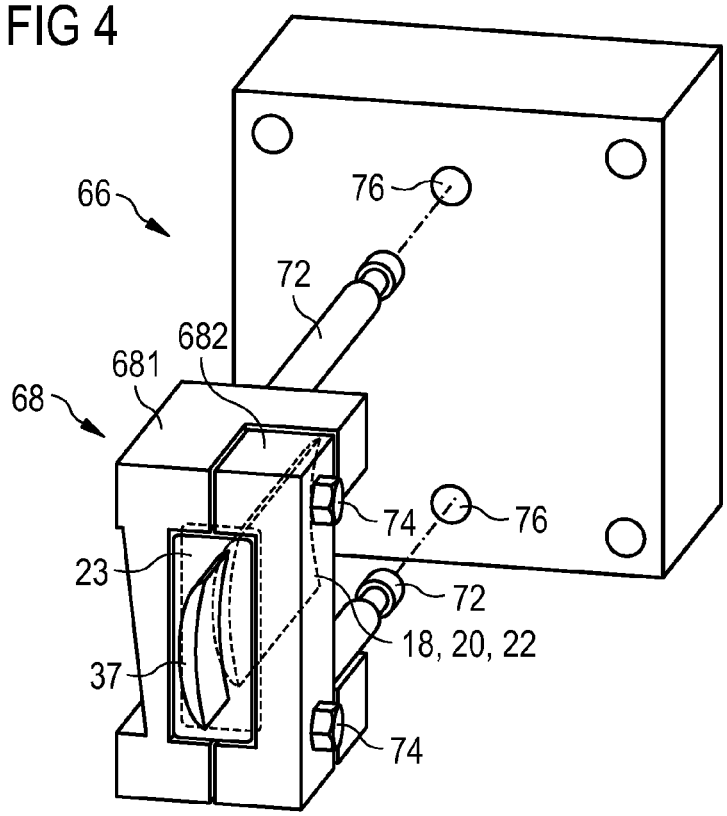
FIG. 4 is an isometric view of a blade clamping mechanism of the device shown in FIG. 2, wherein the blade is mounted and clamped in the mechanism that is structured and operable to be fixed to a structure that moves with an orbital motion.
Figure 5:
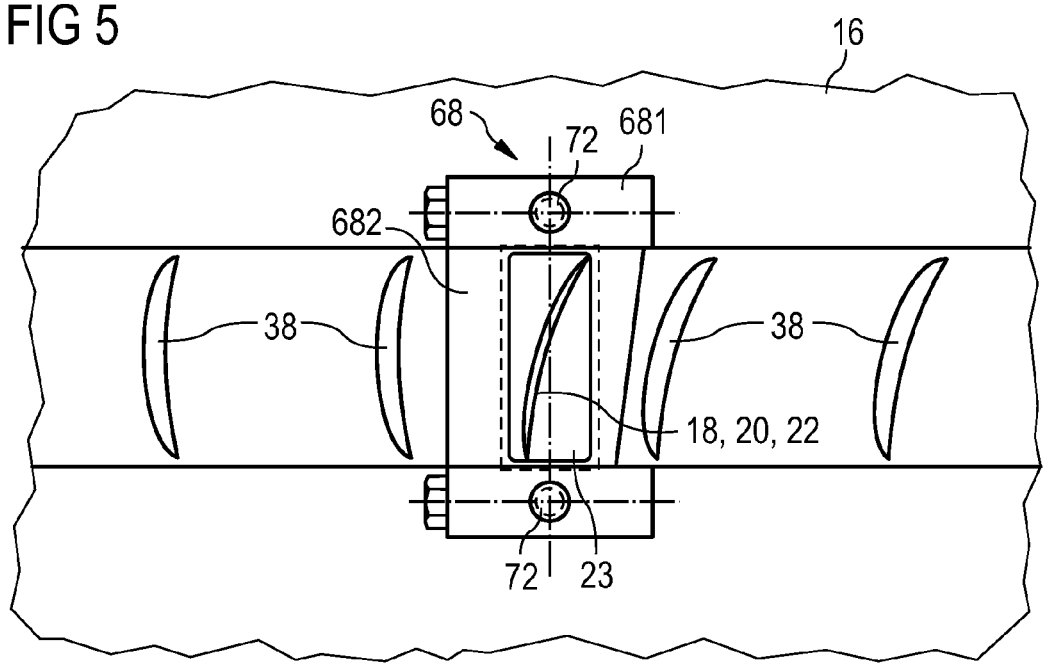
FIG. 5 is a plan view of a portion of the drum with the clamping mechanism of FIG. 4.

FIGS. 4 and 5 illustrate in detail the blade clamping device 68 and the mounting 66 for the blade clamping device 68. The clamping device 68 is generally designed to fit in the space between the blades 18/20/22 and consists essentially of a first part 681 and a second part 682. The first part 681 is the body of the device 68 and the second part 682 is a clamp or jaw designed to be placed under pressure to clamp the blade plate 23 against the body 681 of the device 68. A clamping means, for example, a screwing means such as bolts 74 are arranged transversely near a front face of the device 68. Other such clamping means, such as a thermal shrink-tightening, are also conceivable. The clamp 682 is structured and operable to ensure accurate positioning of the blade 18/20/22, especially at the end to be welded to the drum 14, essentially in the plane of orbital motion. The positioning of the blade 18/20/22 in the blade's axial or main direction can be provided by clamping, or by the clamping device 68 providing a shoulder and/or support at the end of the blade on the bottom of the clamping device 68. Each of the first and second parts 681 and 682 of the clamping device 68 can have a taper that matches, at least partially, the outer surface of the blade 18/20/22. The clamping device 68 comprises a means of rapid fixing to the mounting 66. In various embodiments, the rapid fixing means comprises at least two studs 72 extending generally parallel to the main direction of the blade 18/20/22 and structured to enter corresponding holes 76 in the mounting 66. Each stud 72 comprises a shoulder at a free end structured and operable to engage with a rapid clamping means (not shown) located on the mounting 66. The rapid clamping means can be any suitable rapid clamping means known to those skilled in the art.

It should be noted that the implementation of the clamping device 68 and the mounting 66 can take many forms.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A process for friction welding of blades to a rotor of an axial turbomachine, said process comprising:
    positioning the rotor to provide a faying surface for one of a plurality of blades;
    moving the blade in an orbital frictional motion against the faying surface for the blade in a mean contact plane between the blade and the faying surface such that a welding temperature is generated, the rotor being held motionless in the plane of frictional movement of the blade;
    immobilizing of the blade and exerting a forging pressure on the blade against the rotor; and
    wherein positioning the rotor to provide a faying surface for one of the blades comprises locating a support within the rotor on an internal surface of the rotor opposite to the faying surface for the blade to provide a brace for the faying surface with respect to the forging pressure being exerted on the blade.

2. The process according to claim 1, wherein the rotor is a compressor drum comprising a hollow body that is circularly symmetrical about a main axis of the rotor and defining a hollow interior volume with a first aperture at a front end of the drum and a second aperture at a rear end of the drum.

3. The process according to claim 1, wherein locating the support within the rotor comprises inserting a core inside the rotor, the core providing the support for the opposite internal surface of the rotor, the core extending over at least half the length of the rotor between the first and second apertures.

4. The process according to claim 1, wherein positioning the rotor to provide a faying surface for one of the blades comprises locating the rotor on a cradle via an indexing table such that the rotor is angularly positioned about the rotor main axis relative to the cradle.

5. The process according to claim 4, wherein the cradle is structured and operable to pivot about a transverse axis, perpendicular both to the main axis of the rotor and to the direction of applying pressure to the blade against the rotor during the immobilization of the blade and exerting of the forging pressure on the blade against the rotor.

6. The process according to claim 4, wherein the cradle is movable in translation along a direction generally perpendicular to the direction of applying pressure to the blade against the rotor and mainly within a plane containing the main axis of the rotor.

7. The process according to claim 1, wherein moving the blade in an orbital frictional motion against the faying surface comprises clamping the blade within a clamping device comprising a means of rapidly fixing the clamping device to a mounting and a means of clamping a plate of the blade.

8. The process according to claim 1, wherein the rotor comprises a series of protrusions which have blade-shaped cross sections, each protrusion forming the faying surfaces for a respective blade.

9. The process according to claim 1, wherein the blade comprises a blade that is disposed on that part of the blade to be welded to the rotor, the plate having a protrusion whose cross-section has a blade profile and is configured to be in contact with the faying surface for the blade.

10. A device for friction welding of blades to a rotor of an axial turbomachine, comprising:
   a supporting frame;
   a rotor support structured and operable to hold the rotor immobile during a friction welding operation; and
   a blade support structured and operable to provide an orbital frictional motion and a forging motion of the blade against the rotor at a faying surface on the rotor; and
   wherein the rotor support comprises a cradle pivotally mounted relative to an axis substantially horizontal and perpendicular to the forging movement direction, the cradle comprising a core located within an internal surface of the rotor opposite to the faying surface for the blade to provide a brace for the faying surface with respect to the forging pressure being exerted on the blade.

11. The device according to claim 10, wherein the cradle comprises an indexing table structured and operable to angularly position the rotor about an axis of rotation of the rotor.

12. The device according to claim 10, wherein the cradle comprises a mounting bed for the rotor and a bearing at a distance from the mounting bed, the bearing structured and operable to support a shaft generally perpendicular to the mounting bed.

13. The device according to claim 10, wherein the blade support comprises a mounting structured and operable to support a blade clamping device.

* * * * *